United States Patent
Ramirez Flores et al.

(10) Patent No.: US 10,339,342 B2
(45) Date of Patent: Jul. 2, 2019

(54) DATA TRANSFER BASED ON INPUT DEVICE IDENTIFYING INFORMATION

(71) Applicant: Lenovo (Singapore) Pte. Ltd., New Tech Park (SG)

(72) Inventors: Axel Ramirez Flores, Cary, NC (US); James Anthony Hunt, Chapel Hill, NC (US); Robert James Kapinos, Durham, NC (US); Rod David Waltermann, Rougemont, NC (US); Suzanne Marion Beaumont, Wake Forest, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 19 days.

(21) Appl. No.: 14/274,539

(22) Filed: May 9, 2014

(65) Prior Publication Data

US 2015/0326575 A1    Nov. 12, 2015

(51) Int. Cl.
| | |
|---|---|
| G06F 21/62 | (2013.01) |
| H04L 29/06 | (2006.01) |
| H04L 29/08 | (2006.01) |
| G06F 3/0354 | (2013.01) |
| G06F 21/00 | (2013.01) |
| G06F 3/0484 | (2013.01) |

(52) U.S. Cl.
CPC ...... *G06F 21/6281* (2013.01); *G06F 3/03545* (2013.01); *G06F 3/04845* (2013.01); *G06F 21/00* (2013.01); *H04L 63/0876* (2013.01); *H04L 67/10* (2013.01)

(58) Field of Classification Search
CPC ....... H04L 67/06; H04L 67/10; H04L 63/061; G06F 3/0482; G06F 3/0484; G06F 3/0414; G06F 9/543

USPC .......................................... 235/492; 320/108
See application file for complete search history.

(56) References Cited

U.S. PATENT DOCUMENTS

| | | | |
|---|---|---|---|
| 2004/0189620 A1* | 9/2004 | Roh ..................... | G06F 3/03545 345/179 |
| 2008/0143691 A1 | 6/2008 | Cook | |
| 2010/0079414 A1* | 4/2010 | Ferlitsch ............. | G06F 3/03545 345/179 |

(Continued)

FOREIGN PATENT DOCUMENTS

| | | |
|---|---|---|
| CN | 1524213 A | 8/2004 |
| CN | 1702592 A | 11/2005 |
| CN | 1889087 A | 1/2007 |

OTHER PUBLICATIONS

John Padgette et all, A Guide to Bluetooth Security, Jun. 2012, NIST, Revision 1, pp. 10-21.*

*Primary Examiner* — Ashokkumar B Patel
*Assistant Examiner* — William B Jones
(74) *Attorney, Agent, or Firm* — John L. Rogitz; John M. Rogitz

(57) ABSTRACT

In one aspect, a first device includes a processor and a memory accessible to the processor. The memory bears instructions executable by the processor to identify a first data transfer command based on input from an input device, receive identifying information associated with the input device, and execute the first data transfer command responsive at least in part to authentication of the input device based at least in part on the identifying information. The first data transfer command pertains to the transfer of first data.

20 Claims, 10 Drawing Sheets

(56) References Cited

U.S. PATENT DOCUMENTS

| | | | |
|---|---|---|---|
| 2010/0131675 A1 | 5/2010 | Pan | |
| 2011/0151925 A1* | 6/2011 | Johansson | H04N 1/00381 455/556.1 |
| 2011/0258537 A1* | 10/2011 | Rives | G06F 3/04883 715/255 |
| 2012/0096368 A1* | 4/2012 | McDowell | G06F 9/543 715/748 |
| 2013/0326371 A1* | 12/2013 | Xu | G06F 3/0482 715/753 |
| 2014/0043245 A1* | 2/2014 | Dowd | G06F 3/03545 345/173 |
| 2014/0118765 A1 | 5/2014 | Yang et al. | |
| 2014/0129942 A1* | 5/2014 | Rathod | 715/720 |
| 2014/0253469 A1* | 9/2014 | Hicks | G06F 3/03545 345/173 |
| 2014/0253470 A1* | 9/2014 | Havilio | G06F 3/0412 345/173 |
| 2014/0267339 A1* | 9/2014 | Dowd | H04L 63/0428 345/581 |
| 2014/0297526 A1* | 10/2014 | Martin | G06Q 20/1085 705/42 |
| 2014/0306931 A1* | 10/2014 | Wei | G06F 3/0428 345/175 |
| 2015/0169056 A1* | 6/2015 | Weddle | G06F 3/0414 345/173 |
| 2015/0207850 A1* | 7/2015 | Jitkoff | H04L 67/06 715/748 |
| 2015/0326575 A1* | 11/2015 | Ramirez Flores | G06F 21/00 726/5 |

\* cited by examiner

DATA TRANSFER BASED ON INPUT DEVICE IDENTIFYING INFORMATION

FIELD

The present application relates generally to transferring data based on identifying information for an input device.

BACKGROUND

Transferring data through e.g. copy, cut, and paste actions has become ubiquitous in today's computer-enabled environment. However, there are currently little if any security procedures and user identification procedures that are undertaken when executing a data transfer command, thus leading to data which is to be transferred potentially being compromised and not being tailored to specific users issuing such data transfer commands.

SUMMARY

In one aspect, a first device includes a processor and a memory accessible to the processor. The memory bears instructions executable by the processor to identify a first data transfer command based on input from an input device, receive identifying information associated with the input device, and execute the first data transfer command responsive at least in part to authentication of the input device based at least in part on the identifying information. The first data transfer command pertains to the transfer of first data.

In another aspect, an input device includes a processor and a memory accessible to the processor. The memory bears instructions executable by the processor to sense contact of the input device against a first device different from the input device, provide identifying information to at least one of the first device and a server in response to the contact being sensed, and provide a first data transfer command to at least one of the first device and the server. The identifying information pertains to the input device.

In still another aspect, a method includes receiving a first authentication request at a first device from a second device different from the first device, where the first authentication request is provided with identifying information for a third device different from the first device and different from the second device. The method also includes providing to the second device a first authentication response to the first authentication request, receiving data from the second device, and receiving a second authentication request at the first device from a fourth device different from the first device, the second device, and the third device. The second authentication request is provided with at least a portion of the identifying information for the third device. In addition, the method includes providing to the fourth device a second authentication response, and providing the data to the fourth device responsive to the third device being authenticated at the first device at least in part based on at least the portion of the identifying information.

The details of present principles, both as to their structure and operation, can best be understood in reference to the accompanying drawings, in which like reference numerals refer to like parts, and in which:

DETAILED DESCRIPTION

Figure 1:
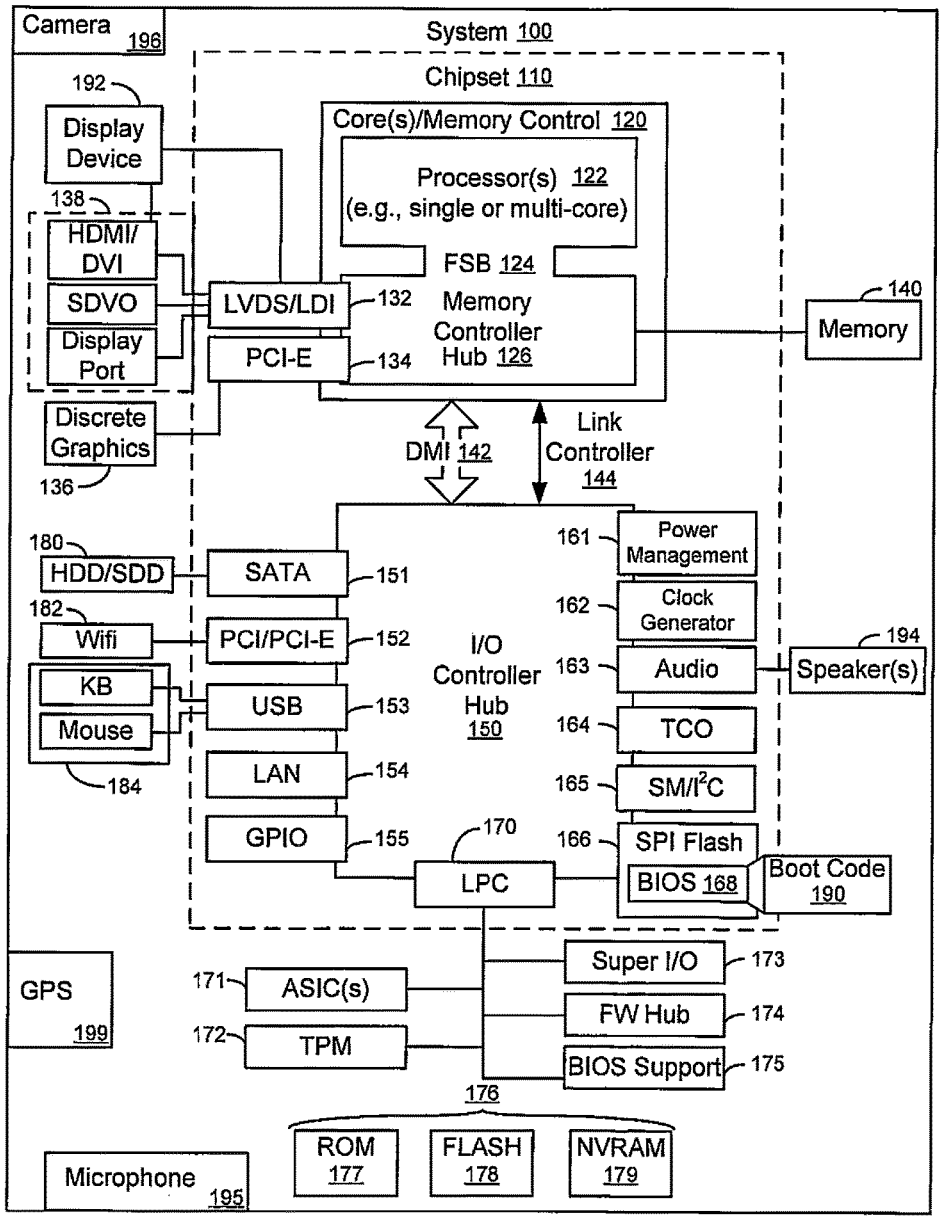
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100 such as e.g. an Internet enabled, computerized telephone (e.g. a smart phone), a tablet computer, a notebook or desktop computer, an Internet enabled computerized wearable device such as a smart watch, a computerized television (TV) such as a smart TV, a so-called convertible device, etc. Thus, in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 is understood to include an audio receiver/microphone 195 in communication with the processor 122 and providing input thereto based on e.g. a user providing audible input to the microphone 195. A camera 196 is also shown, which is in communication with and provides input to the processor 122. The camera 196 may be, e.g., a thermal imaging camera, a digital camera such as a webcam, and/or a camera integrated into the system 100 and controllable by the processor 122 to gather pictures/images and/or video.

Still in reference to FIG. 1, note that a GPS transceiver 199 is also shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
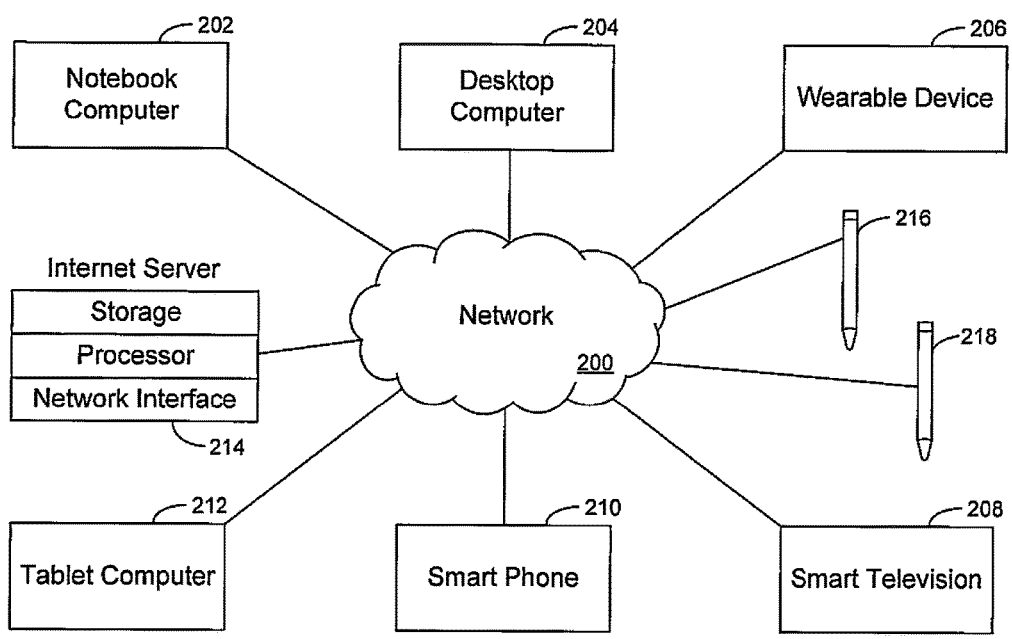
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles is shown. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with present principles such as e.g. an Internet server that may e.g. provide cloud storage accessible to the devices 202-212 (including e.g., hosting a "cloud clipboard" for cut, copy, and paste data for transfer between devices), and also at least one input device 216 and optionally a second input device 218 which may be e.g. independent input devices in that they are not necessarily associated with or attached to any particular one of the other devices 202-212 but may still communicate with them.

In some embodiments, the input devices 216 and 218 may be e.g. electronic pens and/or stylus pens in accordance with present principles. Note further that the input devices 216 and 218 are configured to provide input to one or more of the devices 202-214, including e.g. providing input to touch-enabled pads and touch-enabled displays on the devices 202-214 in accordance with present principles e.g. when in physical contact therewith and/or based on manipulation of the devices 216 and 218 (e.g. by different users).

Furthermore, it is to be understood that the devices 202-218 are configured to communicate with each other over the network 200 to undertake present principles. Is it to also be understood that the input devices 216 and 218 each respectively have their own identifying information associated therewith (e.g. different unique user identifiers (UUID)), which the respective input device 216 or 218 is configured to provide to another device in accordance with present principles. Furthermore, each respective input device 216 and 218 may be associated with a different profile for a different user, where each profile may be associated with a different "cloud clipboard" as described further below, and hence manipulation of each device 216 or 218 may cause different or the same data to be e.g. pasted to a different location.

Figure 3:
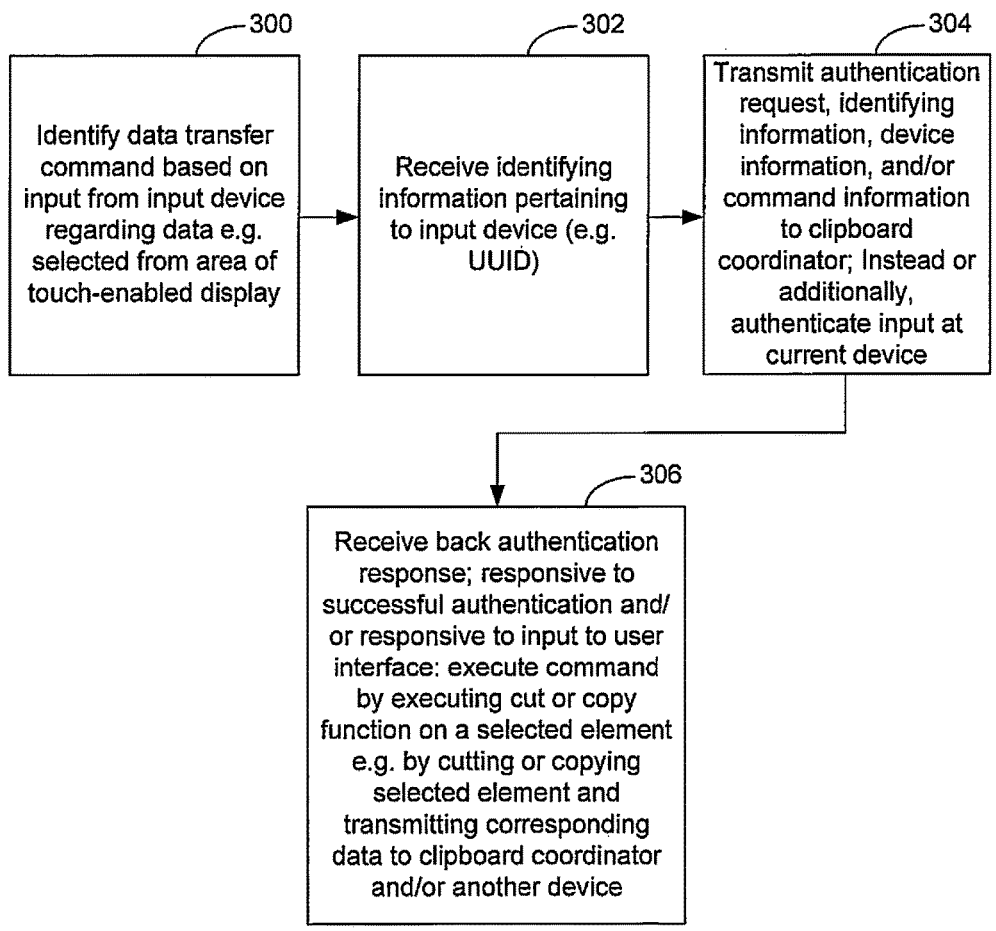
FIGS. 3-6 are flow charts showing example algorithms according to present principles.

Referring to FIG. 3, it shows example logic that may be undertaken by a device such as the system 100 in accordance with present principles when receiving input from an input device such as e.g. a stylus pen. Beginning at block 300, the logic identifies a data transfer command based on input from the input device. The data transfer command may pertain to e.g. data selected from an area of a touch-enabled display of the device undertaking the present logic (referred to below as "the present device") on which the data was presented. E.g., the data transfer command may be identified based on a change in capacitance at an area of the touch-enabled display with which the input device has contact, and/or the lapse of a threshold time with which the input device is in (e.g. uninterrupted, unmoving, and/or unbroken) contact with the area.

From block 300 the logic proceeds to block 302 where the logic receives identifying information pertaining to the input device (e.g. from the input device). The identifying information may include e.g. a unique user identification (UUID) number, a unique input device identification (UIDID) number, profile information for a profile associated with a user of the input device, authentication and data transfer authorization information, etc. The identifying information may be received based on e.g. a passive RFID chip on the input device that is "read" by the present device according to RFID principles. In addition to or in lieu of the foregoing, the identifying information may be received based on network communication between the input device and present device over e.g. a WiFi network and even e.g. a Wi-Fi direct link specifically. Also in addition to or in lieu of the foregoing, the identifying information may be received based on Bluetooth communication between the input device and present device, or still other (e.g. peer-to-peer) methods.

In any case, from block 302 the logic proceeds to block 304 where the logic e.g. automatically without further user input in response to receipt of the identifying information, transmits an authentication request and the identifying information to another device such as e.g. a server (e.g. which in some embodiments may have a "clipboard" which is meant to be a non-limiting term for a e.g. storage area for information that has been cut or copied, and/or may be e.g. embodied in e.g. a "cloud" computing environment hosted on the server) for authentication of the input device based on the identifying information. However, note that in some embodiments the present device may have the requisite information and resources to undertake authentication of the input device at the present device. In any case, note that in addition to the identifying information, the present device may also transmit to the other device e.g. device information for the input device and/or present device, and/or command information pertaining to the data transfer command that was identified at block 300. E.g., the present device may transmit information specific to the type of data transfer command that was identified, such as e.g. a cut or copy command.

Still in reference to FIG. 3, after block 304 the logic proceeds to block 306, at which the logic receives back from the server an authentication response regarding whether the input device has been successfully authenticated, and/or determines whether an authentication attempt executed locally on the present device has been successful. Note further that in some embodiments and regardless of whether the authentication was executed at the server or at the present device, the authentication response and/or determination may further include a indication and/or determination as to whether the input device has been authorized to provide data transfer commands to the present device e.g. based on settings for devices the input device is authorized to provide such commands to. For instance, a particular input device may be enabled by e.g. an administrator to only provide commands to certain device, or to specifically not be enabled to provide data transfer commands to certain devices.

In any case but still in reference to block 306, responsive to authentication of the input device being successful and/or responsive to input to a user interface (UI) such as the one to be described below in reference to FIG. 8, the present device executes the data transfer command by e.g. executing a cut or copy function on a selected element e.g. by cutting or copying the selected element to the clipboard, and/or to a local "clipboard" on the present device, and/or to a "clipboard" on another device such as the input device itself. E.g., the present device may execute the data transfer command by executing a "cutting" or "copying" of a selected element and transmitting data corresponding to the cut or copy of the element (e.g. transmitting the text itself if text was copied, or transmitting the image itself if an image was copied) along with command information (e.g. regarding whether the command was a cut or copy function) to another device such as the server.

Note that as referenced herein, an "element" is understood to be a term that may encompass many different types of data that may be cut, copied, and/or pasted, such as e.g. an element presented on a display of a device, an icon presented on a display of a device, an application on a device, an image presented on a display of a device, an audio file on a device, a video file on a device, an audio video (AV) file on a device, still other files (e.g. word processing documents) on a device, a screen shot taken responsive to a cut or copy command, text (e.g. from a browser or word processing document) selected using e.g. a mouse or the input device, etc.

Figure 4:
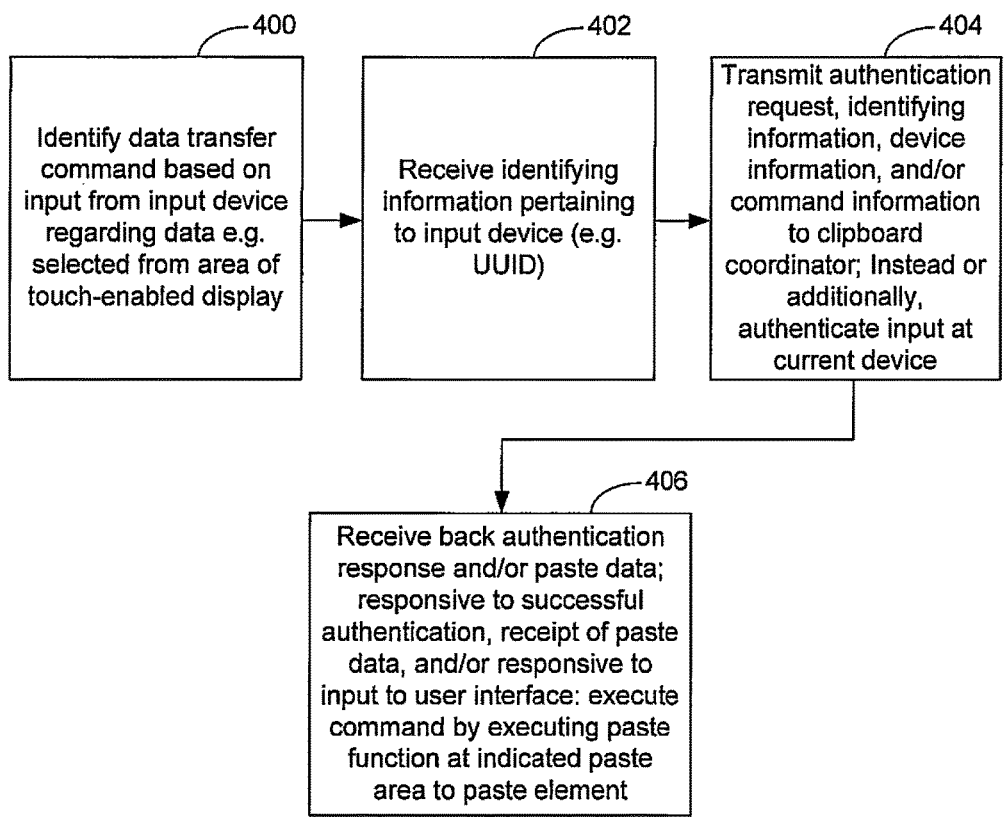

Now in reference to FIG. 4, it shows example logic that may be undertaken by a device such as the system 100 in accordance with present principles when receiving input from an input device such as e.g. a stylus pen. Distinguishing from FIG. 3, FIG. 4 shows logic for when a paste data transfer command is identified. However, it is to be understood that the device undertaking the logic of FIG. 4 may be the same or a different device than a device from which data to be pasted per FIG. 4 was provided.

In any case, beginning at block 400, the logic identifies a data transfer command based on input from an input device as set forth herein. E.g., the command may be identified based on unbroken touch input for a threshold time of the input device being positioned against a display of the device undertaking the logic of FIG. 4 (referred to below as the "present device") on which the data was presented.

From block 400 the logic proceeds to block 402 where the logic receives identifying information pertaining to the input device (e.g. from the input device). The identifying information may include e.g. a UUID and/or still other information referenced herein. From block 402 the logic proceeds to block 404 where the logic e.g. automatically without further user input in response to receipt of the identifying information, transmits an authentication request and the identifying information to another device such as e.g. a server for authentication of the input device based on the identifying information. However, note that in some embodiments the present device may have the requisite information and resources and execute authentication of the input device at the present device. In any case, note that in addition to the identifying information, the present device may also transmit to the other device e.g. device information for the input device and/or present device, and/or command information pertaining to the data transfer command that was identified at block 400. E.g., the present device may transmit information specific to the type of data transfer command that was identified, such as e.g. a paste command.

Still in reference to FIG. 4, after block 404 the logic proceeds to block 406, at which the logic receives back from the server an authentication response regarding whether the input device has been successfully authenticated, and/or receives data for executing the paste command such as e.g. an image to be pasted (e.g. from the input device and/or the server), and/or determines whether an authentication attempt executed locally on the present device has been successful. Note further that in some embodiments and regardless of whether the authentication was executed at the server or at the present device, the authentication response and/or determination may further include an indication and/or determination as to whether the input device has been authorized to provide data transfer commands to the present device in accordance with present principles.

Still in reference to block 406, responsive to authentication of the input device being successful, responsive to receipt of the data, and/or responsive to input to a user interface (UI) such as the one to be described below in reference to FIG. 8, the present device executes the data transfer command in the present instance by executing a paste function on a selected element e.g. by pasting the selected element to an indicated location and/or area (e.g. an area of a touch-enabled display of the present device, an indicated file location and/or file path, etc.) from a cloud clipboard, and/or from a local "clipboard" on the present device, and/or from a "clipboard" on another device such as the input device itself.

Figure 5:
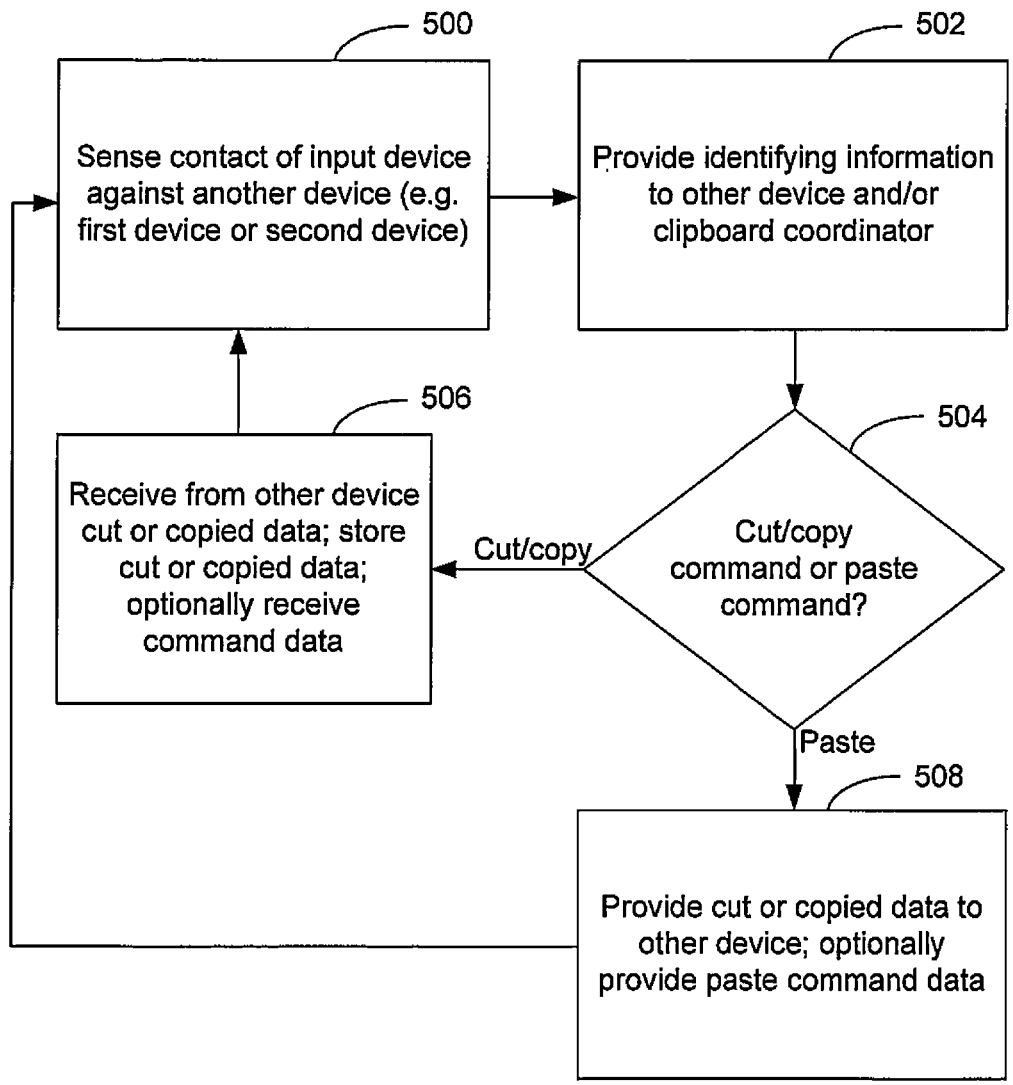

Continuing the detailed description in reference to FIG. 5, it shows example logic to be undertaken by an input device in accordance with present principles. Beginning at block 500, the logic senses contact of the input device against another device (e.g., a tablet computer). The logic then proceeds to block 502, at which the logic (e.g. in response to the contact being sensed and without further user input) provides identifying information for the input device to at least one of the device with which contact was made and/or (e.g. directly to) a server with which the input device is configured to communicate via e.g. a network interface card on the input device.

The logic then proceeds to decision diamond 504, where the logic determines whether a cut or copy command, or a paste command, is to be executed e.g. based on a data transfer command from the input device to the other device to transfer to the input device data to be cut or copied thereto, based on a data transfer command to associate the data to be cut or copied with the input device (e.g. at a clipboard and/or server) and/or with a profile which is associated with the input device, based on a data transfer command to the server to communicate with the other device with which the input device made contact to receive the data cut or copied data at the server from the other device, based on the contact of the input device against the other device, based on information stored on the input device pertaining to a data transfer command, based on information received from another device such as a server, etc.

Responsive to a determination at diamond 504 that a cut or copy command is the type of command to be executed, the logic proceeds to block 506 where the logic may receive from another device data which has been cut or copied. Also at block 506, the data is stored. Also at block 506, command data pertaining to the cut or copy command may also be received and/or stored. From block 506 the logic may then revert back to block 500.

However, responsive to a determination at diamond 504 that a paste command is the type of command to be executed, the logic instead moves from diamond 504 to block 508. At block 508 the logic provides cut or copied data to the device, and/or provides a data transfer command to the device to receive and/or store the cut or copied data (e.g. via download from a cloud clipboard in accordance with present principles), and/or provides a data transfer command to the device to paste the cut or copied data e.g. to a particular and/or specified area (e.g. a storage area and/or display area). Furthermore, at block 508 the logic may provide other paste command data, such as e.g. identification of a user profile and/or input device profile with which the paste command is associated, where at the device to paste the data, and even e.g. where at a display of the other device to paste the data, etc. From block 508 the logic may revert back to block 500.

Figure 6:
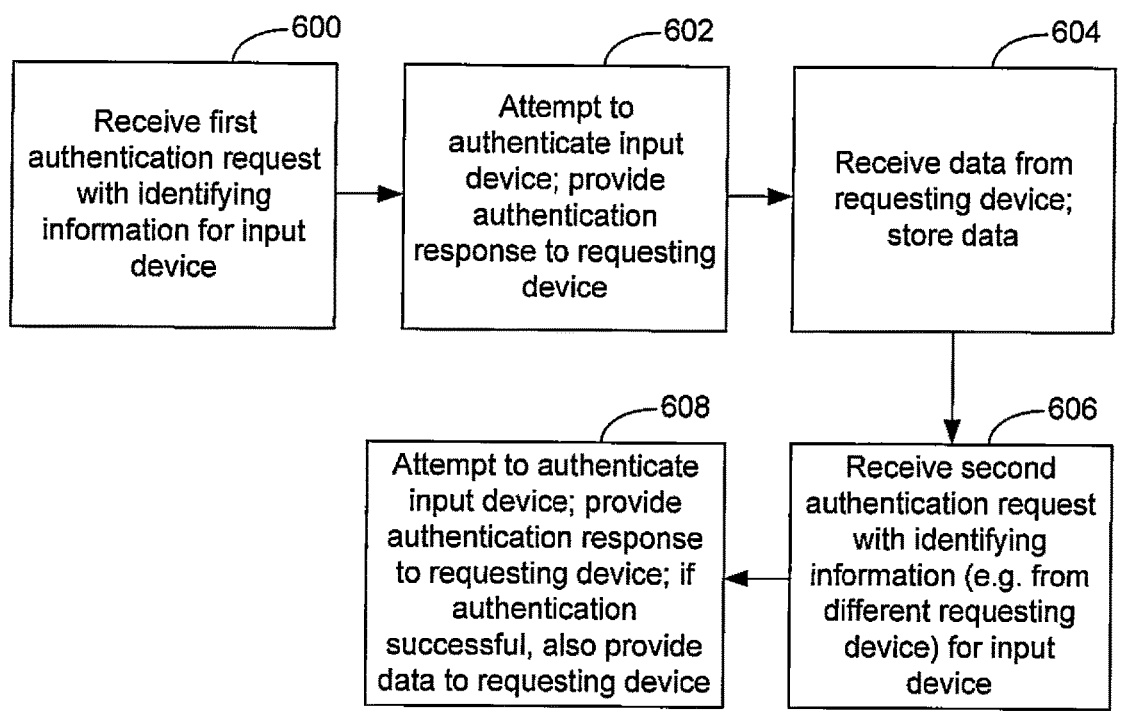

Before describing FIG. 6, as indicated above, it is to be understood that the logic of FIG. 5 is an example. It is to thus be understood that e.g. a data transfer command may in some embodiments be received from a server and that the input device e.g. provides only identifying information for the input device. Then e.g. based on the identifying information, the device to which the identifying information was provided communicates with the server to receive data to be pasted based on authentication of the input device at the other device and/or server. However, it is to also be understood that in some embodiments the input device may provide the identifying information and the data to be pasted, but the paste command itself may be received at the other device from the server.

Now describing FIG. 6, it shows example logic to be executed by a server in accordance with present principles. Such a server may e.g. host a cloud computing environment that itself has a "cloud clipboard" where cut or copied data may be stored for pasting to a different device than the one from which the cut or copied data was provided. Beginning at block 600, the logic receives a first authentication request along with identifying information for an input device from a device e.g. that has been contacted by the input device in accordance with present principles. The logic then proceeds to block 602 where the logic attempts to successfully authenticate the input device e.g. based on the identifying information that is received at block 600. Also at block 602, the logic then provides an authentication response to the device from which the authentication request was received, whether the response is that the input device was successfully authenticated, that authentication failed, etc.

From block 602 the logic proceeds to block 604 where the logic receives e.g. cut or copied data from the requesting device and stores the data (e.g. to a cloud clipboard). The logic then moves to block 606 where the logic receives a second authentication request (e.g. from a different device than provided the request above) that includes identifying information for the (e.g. same) input device. The logic then proceeds to block 608 where the logic attempts to successfully authenticate the input device e.g. based on the identifying information that is received at block 606. Also at block 608, the logic then provides an authentication response to the device from which the authentication request was received at block 606, whether the response is that the input device was successfully authenticated, that authentication failed, etc. In addition, at block 606 the logic may provide the data received and stored at block 604 to the device which provided the second authentication request so that e.g. the data may be pasted at that device responsive to receipt of a successful authentication indication from the server undertaking the present logic.

Figure 7:
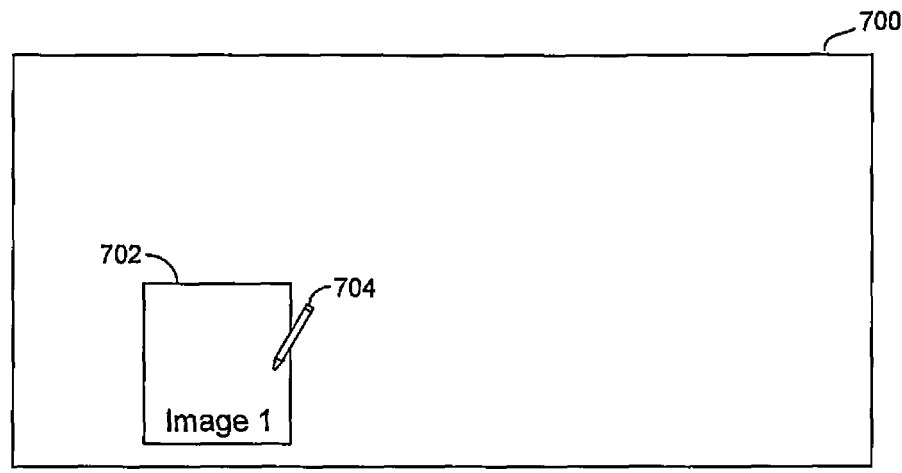
FIGS. 7-14 illustrate example user interfaces (UIs) according to present principles.
Figure 8:
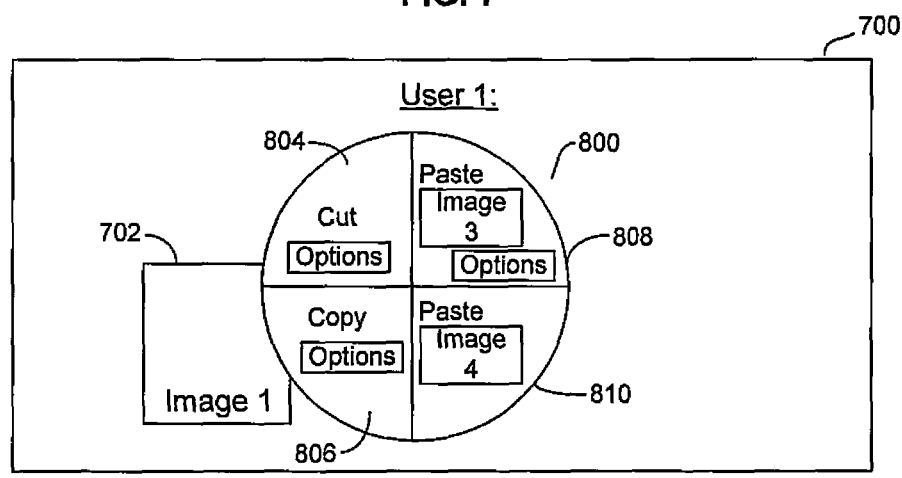
Figure 9:
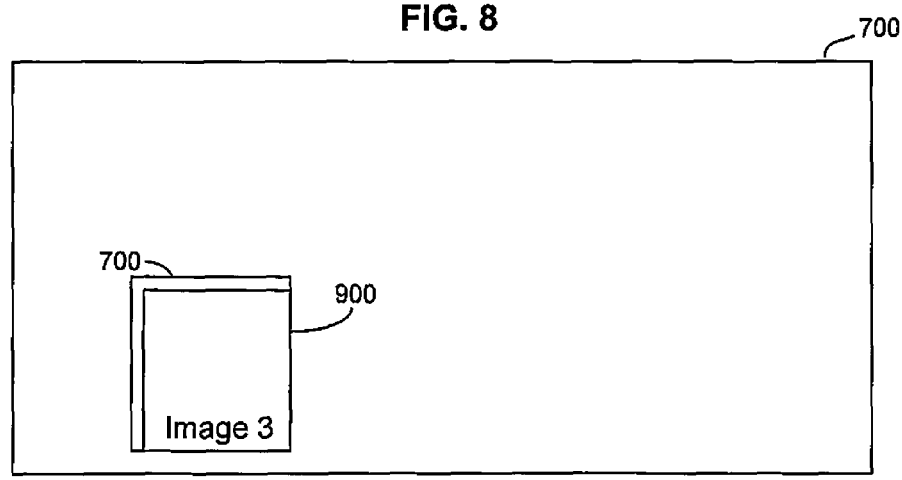

Continuing the detailed description in cross-reference to FIGS. 7-9, a touch-enabled display 700 of a device such as e.g. the system 100 described above is shown as presenting an image 702. As shown in FIG. 7, an input device 704 is contacting the display 700 at an area presenting the image 702. Responsive to e.g. a threshold time expiring during which the input device 704 is in (e.g. uninterrupted) contact with the area and even e.g. during which the portion of input device 704 which contacts the display 700 does not move, a UI 800 is presented as shown in FIG. 8.

As may be appreciated from FIG. 8, the UI 800 is presented on a portion of the display 700 and in some embodiments is e.g. overlaid on the portion such that it is overlaid on at least part of the area of the display on which the image 702 would otherwise be presented. Further, the UI 800 may be centered at the point at which the input device makes contact with the display. Further still, it is to be understood that the UI 800 may remain presented e.g. even after the input device ceases contacting the display 700 such as e.g. for a threshold time. In any case, the UI 800 includes an indication 802 of a user and/or profile with which the input device and/or data presented on the UI 800 is associated. Thus, it is to be understood that the information, selector elements, etc. presented on the UI 800 may vary depending on the input device being used such as in embodiments when e.g. plural input devices are associated with different particular users and/or different particular profiles.

Still in reference to the UI 800, it includes plural selector elements 804, 806, 808, and 810 that are each selectable to automatically without further user input responsive thereto execute a command associated with the respective selector element and e.g. indicated in text on the respective selector element as shown. Thus, the selector element 804 may be selected to automatically responsive thereto cause the image 702 to be cut (and e.g. cause the associated data to be transferred to one or more clipboards local to the device of FIG. 8, a server clipboard, and/or input device clipboard), the selector element 806 may be selected to automatically responsive thereto cause the image 702 to be copied (and e.g. cause the associated data to be transferred to one or more clipboards local to the device of FIG. 8, a server clipboard, and/or input device clipboard), the selector element 808 may be selected to automatically responsive thereto cause a first image to be pasted at the location of the contact of the input device and hence be pasted at least partially over the image 702 (e.g. based on the data being transferred from one or more clipboards), and the selector element 810 may be selected to automatically responsive thereto cause a second image different from the first image to be pasted at the location of the contact of the input device and hence be pasted at least partially over the image 702 (e.g. based on the data being transferred from one or more clipboards).

Furthermore, note that the selector elements 808 and 810 respectively show representations of the data which will be pasted responsive to selection of the respective selector element to thus provide a preview of the data which will be pasted responsive to selection of the element and/or allow a user to identify the data which will be pasted responsive to selection of the element. However, note that the differing data to be transferred responsive to selection of either the elements 808 and 810 are still both associated with the same profile and/or input device (e.g. that was used to cut or copy both). Also note that any of the elements 804-810 may optionally also present a respective options selector element which if selected causes a different function to be executed than the respective cut, copy or paste function of the respective element responsive to selection of a portion of the same selector element not presenting the options selector element. The options selector element may be selected to automatically responsive thereto e.g. cause settings and/or options UI to be presented for configuring data transfer settings, and/or may cause still another UI to be presented (e.g., the UI 1000 to be described below in reference to FIG. 10) such as e.g. a listing of other data stored on one or more "clipboards" that may be pasted.

FIG. 9 shows an example of when e.g. the selector element 808 has been selected to thus cause the image 900 (also represented on the selector element 808 as shown) to be pasted over at least a portion of the image 702 since that is the area of the display 700 with which the input device made contact and hence the area at which the image 900 is to be pasted.

Figure 10:
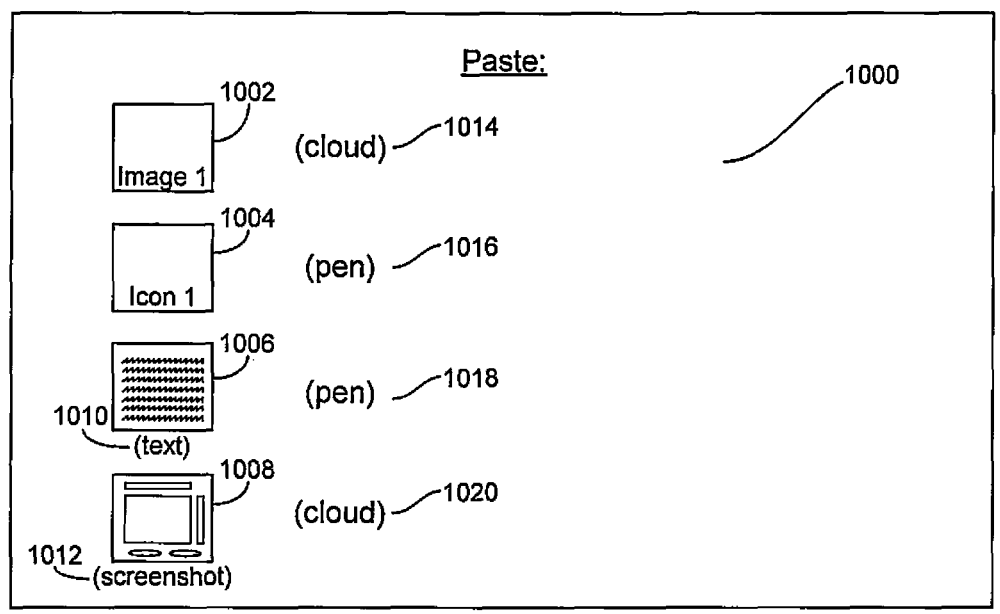

Before moving to the description of FIG. 10, it is to be understood that still other selector elements maybe presented on a UI such as the UI 800, and that such selector elements may in example embodiments be dependent on, and thus presented based on, context such as e.g. whether a cut or copy command is to be executed or whether a paste command is to be executed. Thus, e.g. in some embodiments such a UI may only present cut and/or copy options, while in other embodiments such a UI may only present paste options. What's more, other selector elements that may be included may be selector elements for only copying a portion of cut or copied data from a clipboard. As other examples, e.g., selector elements maybe presented for pasting data as a picture or image even if stored in a non-picture format (e.g. to thus be presented as a screen shot), for changing the color of presentation of the data when pasted such as e.g. changing the color of annotations or other text.

Now in reference to the UI 1000 of FIG. 10, it shows a listing of data from one or more clipboards, where data as represented on the UI 1000 may be selected from the UI 1000 to be pasted in accordance with present principles. Thus, it is to be understood that in some embodiments, the UI 1000 may be generated e.g. locally at the device presenting the UI 1000 based on the clipboards to which the device presenting the UI 1000 has access (e.g. a cloud storage area, a storage area on the device itself, a storage area on an input device with which the device is communicating, etc.). Furthermore, it is to be understood that while e.g. the UI 1000 may be accessed for selecting data for pasting, in some embodiments e.g. the most-recently cut or copied data from one or more clipboards may be the default data for a paste command e.g. not provided based on manipulation of the UI 1000 but instead e.g. automatically without further user input responsive to selection of a paste button on an input device (such as the one to be described in reference to FIG. 15), or responsive to still other paste commands not invoking the UI 1000 and/or based on input to the UI 1000.

In any case, as may be appreciated from FIG. 10, the UI 1000 includes plural representations 1002-1008 of data that may be pasted, where one or more may be accompanied by descriptions of the data such as e.g. a description 1010 that the representation 1008 pertains to text data and a description 1012 that the representation 1012 pertains to a screen shot. Note further that each of the representations 1002-1008 include respective source indicators 1014-1020 indicating the (e.g. clipboard) source of the data that is associated with the respective one of the representations 1002-1008. Furthermore, it is to be understood that selection of one of the representations 1002-1008 may in some embodiments automatically responsive thereto cause the data associated therewith to be pasted at a location indicated using an input device (e.g. in an instance such as when the UI 1000 was presented responsive to selection of an options selector element from the elements 808 and 810 described above).

Figure 11:
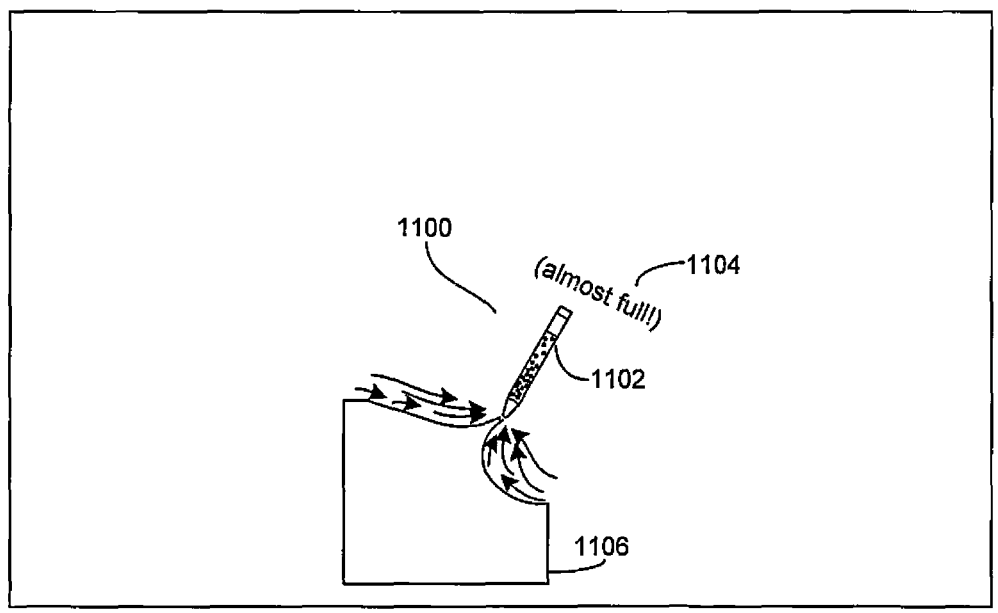

Continuing the detailed description with reference to FIG. 11, it shows an example representation 1100 of an input device being presented on a display of a device. The representation 1100 includes an image 1102 of an input device along with an indication 1104 of the total currently available storage capacity of the input device represented by the image 1102. Thus, it is to be understood that the representation 1100 pertains to an input device most-recently in contact with, and/or still in contact with, and/or with which the device is currently communicating (e.g. receiving data and/or data transfer commands therefrom). Note that the representation 1102 also includes equidistant storage capacity increment markers juxtaposed longitudinally along the image 1102, where some sections may be e.g. shaded to thus reflect the currently unavailable storage capacity, while others may not be shaded to thus reflect the currently available storage capacity.

Note further that the representation 1100 may be presented responsive to and/or during execution of a data transfer command. In the example shown, e.g., an element 1106 is being cut or copied to an input device, and hence is shown as being "sucked into" or otherwise absorbed into the image 1102 of the input device. Also, the shading of the storage capacity increment markers thus reflects the amount unavailable storage including the amount now occupied by data corresponding to the element 1106.

Figure 12:
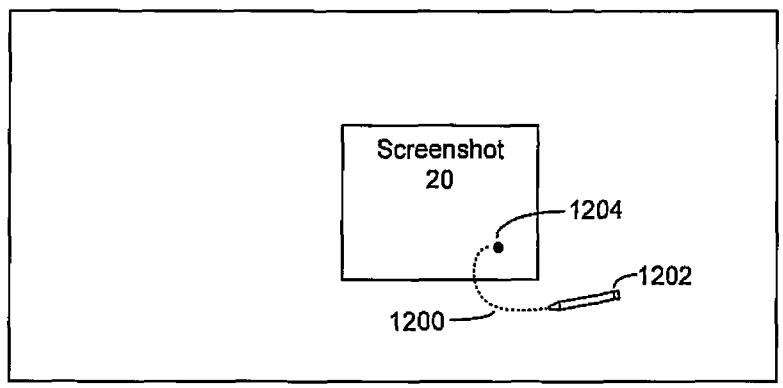
Figure 13:
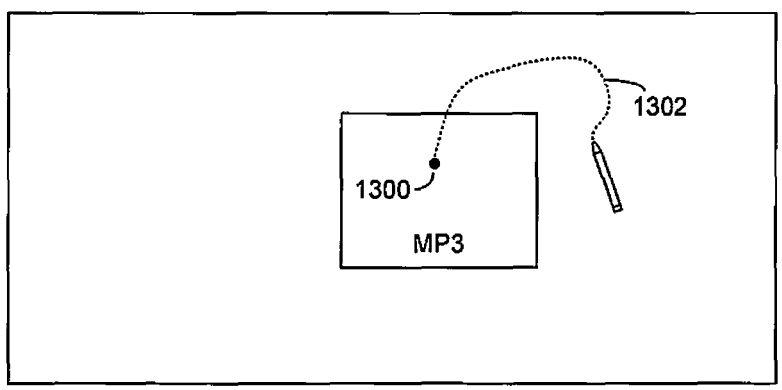
Figure 14:
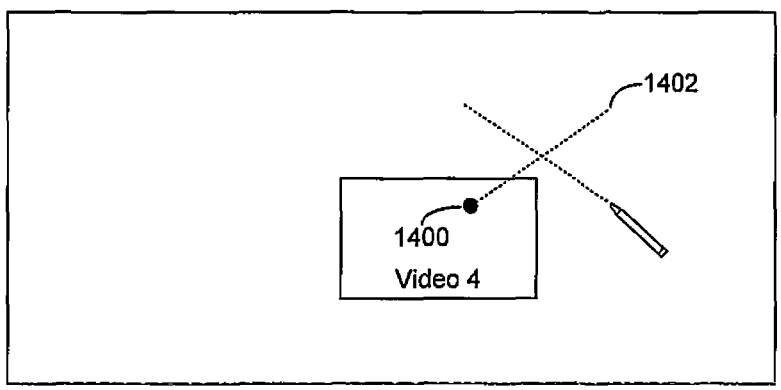

Turning now to FIGS. 12-14, it is to be understood that various ways of manipulating an input device in accordance with present principles to provide a cut, copy, or paste command may be used, such as by e.g. tracing a character on a display with an input device, where the device having the display recognizes the tracing and hence the command. Thus, as shown in FIG. 12, a tracing may be made using an input device 1202 by contacting the display to "draw" a tracing representative of the letter "C" beginning at an initial point 1204, where the point 1204 is the location at which the input device makes initial contact with the display when drawing the letter "C," and is also a point corresponding to and associated with an element or location on which to execute a data transfer command. E.g. in the present instance where a "C" is drawn, the element screen shot twenty will be copied responsive to the drawing of the "C" beginning at the location point 1204 and/or at least based on e.g. the initial point 1204 being at the portion of the display presenting the element screen shot twenty to thus provide input to the device that screen shot twenty is the data to be copied. However, note that in addition to or in lieu of the input device and/or device with which the input device is making contact determining data to copy based on an initial contact point, such a determination may be made based on e.g. a majority of a tracing being directed to a particular element and/or a threshold (e.g. initial) amount of a tracing being directed to a particular element.

FIGS. 13 and 14 show other examples, where initial points 1300 and 1400 respectively correspond to locations for pasting (e.g. responsive to detection of a tracing 1302 of the letter "P" for paste) and cutting (e.g. responsive to detection of a tracing 1402 of the letter "X" for cut).

Figure 15:
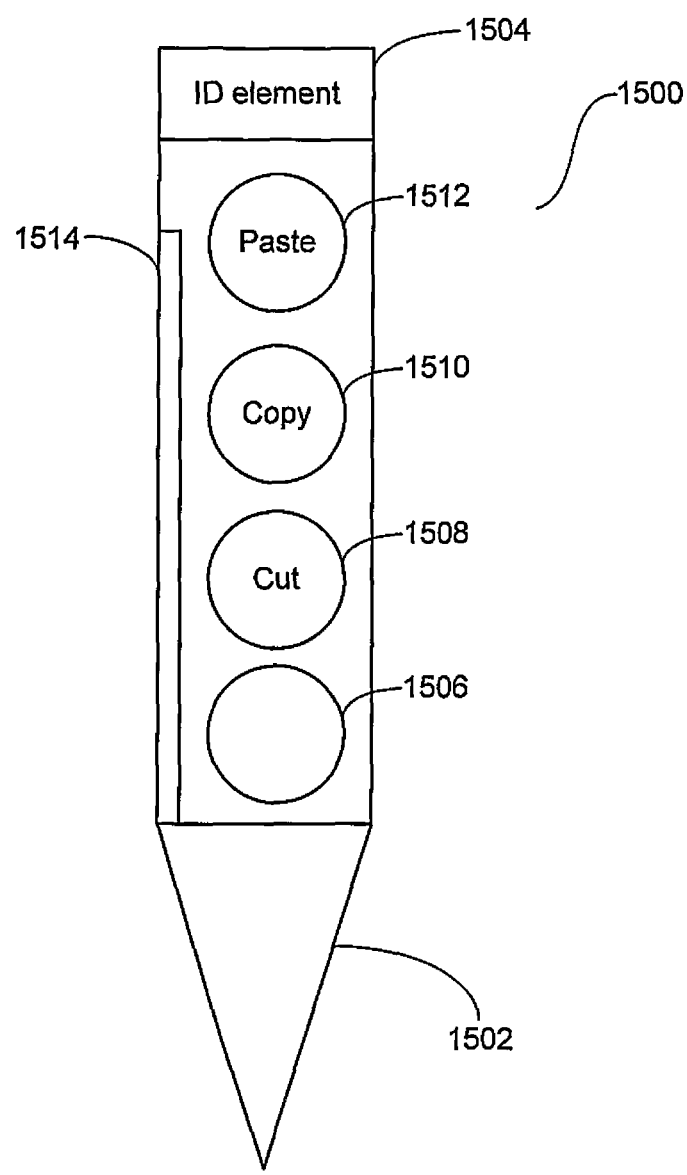
FIG. 15 is an example input device in accordance with present principles.

Now describing FIG. 15, it shows an example input device 1500 that may be used in accordance with present principles. Note that the input device 1500 includes a tip 1502 configured for providing input to another device e.g. based on contact therewith and/or proximity thereto. Also shown is an ID element 1504 which may be e.g. a passive RFID element, a storage area storing identifying information for the input device 1500 to be communicated by the device 1500 to another device, an NFC tag, etc.

The element 1504 may also be a biometric and/or pressure sensor for sensing the biometrics of a user and/or for sensing pressure applied to a display device to thus associate the output of the sensor with a biometric output or applied pressure typically provided by a particular user and hence determine a particular user (and hence particular clipboard) based thereon that is using the input device 1500. E.g., since sometimes different users exert differing levels of pressure using the same input device or a similar one, different pressure and/or capacitive profiles may be created and associated with the different users to thus identify a specific user using the input device 1500 based on pressure and/or capacitance. Note that although biometrics and/or pressure are disclosed as being sensed at the input device 1500 above, it is to be understood that biometrics and/or pressure may be used to determine a user providing input based on biometrics and/or pressure being sensed at the device with which the input device 1500 is making contact as well.

Still in reference to FIG. 15, also shown is a fingerprint reader 1506. The fingerprint reader 1506 may be used to gather data for the fingerprint of a user for authentication purposes, and/or also for gathering data for the fingerprint of a user to identify the user of the input device 1500 to thus identify data associated with the user and/or the user's profile for execution of a data transfer command (e.g. to identify a particular clipboard for access to execute a data transfer command).

E.g., one input device may be configured for use by plural persons, where each person has their own data transfer clipboard (e.g. in different cloud storage areas) from which data may be transferred. Thus, responsive to input from the fingerprint reader, the input device 1500 may determine which of plural users is currently manipulating the input device 1500 to execute e.g. a paste command, and thus determine which clipboard to access to determine an element to be pasted therefrom.

In addition to the foregoing, the input device 1500 may include buttons 1508, 1510, and 1512 for respectively inputting cut, copy, and paste commands. The buttons may be illuminable with different colored lights as well, such as e.g. different colored light emitting diodes (LEDs). Additionally, an LED bar 1514 may be included on the input device 1500 that is illuminated relative to the amount of either available storage capacity or occupied storage capacity of the input device 1500. Thus, e.g., if seventy percent of the storage capacity of the input device 1500 is available, seventy percent of the bar 1514 may be illuminated. Conversely but as another example, if sixty percent of the storage capacity of the input device 1500 is occupied, sixty percent of the bar 1514 may be illuminated.

Without reference to any particular figure, it is to be understood that selection of e.g. text using a stylus pen in accordance with present principles (e.g. for a cut or copy of the text) may be done by initially positioning a portion of the pen against a portion of a display presenting the first character sought to be cut or copied, and then moving the pen left to right, up to down until the pen is over the last character sought to be cut or copied. However, when not copying text but instead copying a file such as an image, any portion thereof may be selected to copy the entire file or image.

Furthermore, it is to be understood that e.g. when data is cut or copied from a first device but presenting the data per a paste command e.g. either requires a particular application not supported by or installed on a device to which the data will be pasted and/or is in a file format not supported by the device to which the data will be pasted, the data may be collected at the cut or copy device as a screen shot and then may be pasted as a screen shot to the other device. Accordingly, in some embodiments the cutting or copying device and paste device may communicate with each other to thus determine the capabilities of the other device and whether or not such data is supported and/or whether the pasting device has the application to present the data in its native file format. In such an instance, a screen shot may be created in a format recognized by the pasting device. This may be clone when e.g. a note taking application collects data regarding input to e.g. a desktop screen of a device and/or to a note taking application UI, where the device to which such note taking data is to be pasted does not support the note taking application. Thus, the device having the note taking application may collect the data and convert it into a screen shot representing the handwriting (e.g. by taking a screen shot of the UI with the writing from the user included thereon) and then transmit the screen shot data to e.g. an input device and/or the pasting device.

Still without reference to any particular figure, it is to be understood that identifying information for an input device as described herein may be determined using a capacitive display device in contact with an input device. Thus, e.g. when using a "passive" stylus pen for identification of a unique user, a unique styli tip may be provided on the input device that essentially mimics the uniqueness of a human fingerprint in that each pen may have its own unique, one of a kind tip for providing input to a device that may include a set of arcs, loops, unique ending and branching of lines, etc., and may each even be of different shapes and sizes and/or made of different materials to create unique levels of capacitance when in contact with and sensed by a display device. E.g., to create a unique capacitance, the unique texture tips may be comprised of several materials such as e.g. metal alloys, cellulose wood fibers, silicone or foamed plastic polymers, etc. Thus, it is to be understood that a device communicating with such a pen may have a capacitive-sensing display configured to measure capacitance of the varying pen tips and/or measure varying tip shapes and sizes when in contact therewith. In addition to the foregoing, such display devices may be configured to detect e.g.

different pen colors and even e.g. different tip colors to thus identify and distinguish between pens with different colors (e.g. based on the capacitive-sensing display and/or based on input from a camera).

In addition to the foregoing, other ways may be used of identifying unique input devices and hence unique users to thus determine which cut/copy/paste clipboard should be used when undertaking a data transfer command, such as including on the input device a conductor extending from the body of the pen to the tip that measures the biometric signature of a user as input to the touch screen. In addition to or in lieu of the other methods described herein, facial recognition of a user may also be used e.g. responsive to a determination that the user is holding the input device based on at least one image gathered by a camera on either the input device or the device with which the input device is engaging.

Still without reference to any particular figure, e.g. a cloud storage device (e.g. a server) may receive input device identifying information for authentication of the input device thereat, and/or authentication may occur at either or both of the device interacting locally with the input device for a cut or copy command and the device interacting locally with the input device for a paste command (e.g. the devices with which the input device makes contact in accordance with present principles).

Additionally, it is to be understood that a "clipboard" for storing cut or copied data for pasting to another device in accordance with present principles may exist e.g. on a cloud storage device, on the input device itself, and/or on either or both of the device interacting locally with the input device for a cut or copy command and the device interacting locally with the input device for a paste command (e.g. the devices with which the input device makes contact in accordance with present principles). In addition, it is to be understood that communication of clipboard information (e.g. cut or copied data) may occur between one or more of these devices e.g. by WiFi direct communication, the Internet, Bluetooth communication, near field communication (NFC), etc. But in any case, it is to be further understood that the clipboard to which or from which cut, copy, or paste information is provided may be associated with a particular user, and that input device identifying information for a particular input device may be associated with the same user and the user's corresponding profile, e.g. such that manipulation of an input device having identifying information associated with a user's profile may cause e.g. cut or copied data to be provided to and stored at that particular user's clipboard. Thus, when a paste command is provided to another device with the same input device, the other device is able to access the same clipboard by also using the identifying information for the input device to thus access data cut or copied by that particular user for pasting. Accordingly, present principles recognize that different input devices associated with different users may be used on the same cutting or copying device to cut or copy data to different clipboards, and that different input devices associated with different users may also be used on the same pasting device to paste data thereto from different clipboards.

Notwithstanding, note that in other embodiments a particular clipboard may be associated with a group of users, and/or may be accessible by a group of users for cutting and copying data thereto and pasting data therefrom based on e.g. manipulation of plural different input devices all associated with or granted access (e.g. permissions to) the same clipboard. What's more in some embodiments a user may share his or her own personal clipboard such that others may access, cut, copy, and paste data to and from it.

Still without reference to any particular figure, it is to be understood that when pasting data in accordance with present principles (by e.g. contacting an input device against the display of another device), if the contacted area is presenting a folder it may be determined that the folder is the paste location and the data may be pasted e.g. as a file to the folder. As another example, if the contact area is to a document that is open (e.g. a word processing document), it may be determined that the document is the paste location and the data may be pasted at the point of the document where the input was provided by the input device. Also note that in some embodiments, e.g. when pasting to a particular device data of a particular file format, the device may automatically responsive thereto launch an application for presenting the data.

In addition to the foregoing, present principles recognize that e.g. when first cutting or copying data at one device, a UI may be presented for indicating a particular location at which the data should not only be stored but also pasted on another device. E.g., the UI may provide a selector element for commanding the cut or copied data be automatically pasted to another device, and/or e.g. even another particular area of that device, and/or stored in another folder on the other device in addition to being stored at a particular clipboard.

Again without reference to any particular figure, present principles recognize that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave.

It may now be appreciated based on the foregoing that transferring data between devices may occur with an action such as touching one device with a stylus and later touching another device based on e.g. user identification and user authentication. Present principles may be undertaken using a pen for user identification and authentication to perform a save action to a e.g. cloud storage location that acts as a "cloud clipboard." The "cloud clipboard" may also reside locally at the initial device from which cut or copy data was taken and the data may be transferred e.g. via a peer to peer method such as Bluetooth, Wi-Fi direct, etc. The pen identifies and authenticates the user with a method that communicates its identity to the computer and cloud clipboard. The pen may also communicate an intended user action to the cloud clipboard service, such as a copy or a paste. Also, note that e.g. identifying information in accordance with present principles may be authenticated at the devices disclosed herein using software that is also used to present and/or accept data to be selected and/or transferred.

Furthermore, more than one pen may be used in accordance with present principles, and each pen may have its own unique identity, thus allowing it to be used among different compatible devices. The cloud clipboard service recognizes the pen's identity, and performs authentication and the intended user action. For example, if the cloud clipboard service receives a copy action, the intended data (e.g. a pen-selected region) may upload from the initial device to the cloud clipboard. If the cloud clipboard receives a paste action, the intended data or last clipboard item may download from the cloud clipboard to the targeted device, and insert it at the pen's current contact location. The cloud clipboard may also allow a user to bring previous or multiple cut or copied items to the targeted device(s) e.g. with a special pen context menu. Furthermore, the last clipboard item may in some instances be the default item to be pasted. Additionally the cloud clipboard service may include data integrity and security features to assure that the cut, copy, and paste actions are correctly carried out. What's more, as a sharing feature, a user can set the cloud clipboard service to be public or private, to allow one or multiple users to access it (e.g. and only access rather than cut, copy, or paste data therefrom), and/or cut, copy, and/or paste data therefrom.

Further still, in some embodiments a pen in accordance with present principles may have an element for sensing a gesture to thus be recognized at the device, pen, and/or a cloud clipboard to thus initiate and complete an intended action(s) such as copy or paste. A user-generated action may come from a gesture such as e.g. a letter "C" to invoke a copy action. Similarly, a letter "P" gesture may invoke a paste action.

By uniquely identifying different pens, a cloud clipboard service may allow for collaborative pen activities. For example, in a multiple user scenario, users can draw or record simultaneously on the same device each with their own pen ID. The input may be identified as corresponding to a particular pen and/or ID, and thus be stored on a clipboard associated with the pen and/or ID for pasting.

While the particular DATA TRANSFER BASED ON INPUT DEVICE IDENTIFYING INFORMATION is herein shown and described in detail, it is to be understood that the subject matter which is encompassed by the present application is limited only by the claims.

What is claimed is:

1. An input device, comprising:
   a portable housing;
   at least one processor supported by the portable housing; and
   at least one light accessible to the at least one processor, wherein the at least one light establishes a bar that extends longitudinally along the portable housing relative to a longitudinal axis of the portable housing; and
   storage accessible to the at least one processor and bearing instructions executable by the at least one processor to:
   indicate, via the at least one light, available storage capacity of the input device, wherein the available storage capacity is indicated by illuminating a first amount of the bar that is less than a total illuminable amount of the bar;
   sense physical contact of the input device against a first device different from the input device; and
   in response to the physical contact being sensed, provide information to at least one of the first device and/or a server as part of a cut, copy, or paste operation.

2. The input device of claim 1, wherein the instructions are further executable by the at least one processor to:
   receive, from the first device, first data;
   store the first data at the input device; and
   provide, to a second device in response to contact of the input device against the second device, the first data.

3. The input device of claim 1, comprising:
   a cut selector on the portable housing and selectable to indicate a cut operation;
   a copy selector on the portable housing and selectable to indicate a copy operation; and
   a paste selector on the portable housing and selectable to indicate a paste operation;
   wherein the cut selector, copy selector, and paste selector are different from each other and are located at different portions of the portable housing; and
   wherein the cut copy, and paste selectors are each illuminable with different color lamps.

4. The input device of claim 1, wherein the at least one light comprises at least one light emitting diode (LED).

5. The input device of claim 1, wherein the at least one light indicates the available storage capacity by conveying occupied storage capacity.

6. The input device of claim 1, wherein the at least one light indicates the available storage capacity by conveying the available storage capacity.

7. The input device of claim 1, comprising a radio frequency identification (MD) element that comprises data identifying the input device.

8. The input device of claim 1, wherein the information comprises data identifying the input device.

9. The input device of claim 1, wherein the information comprises data that was cut from another device different from the first device and/or data that was copied from another device different from the first device.

10. An input device, comprising:
    at least one housing;
    at least one processor supported by the at least one housing;
    at least one light bar accessible to the at least one processor; and
    storage accessible to the at least one processor and bearing instructions executable by the at least one processor to:
    receive data from a second device different from the input device, the data being received as a result of at least one command comprising a cut command, a copy command, and/or a paste command;
    store the data at the input device; and
    indicate, via the at least one light bar, an available storage capacity of the input device subsequent to storing the data, wherein the available storage capacity is indicated by illuminating a first amount of the at least one light bar that is less than a total illuminable amount of the at least one light bar.

11. The input device of claim 10, wherein the data is received as a result of at least one command comprising a cut command and/or a copy command.

12. The input device of claim 10, wherein the at least one light bar comprises at least one light emitting diode (LED).

13. The input device of claim 10, wherein the at least one light bar indicates the available storage capacity by conveying occupied storage capacity.

14. The input device of claim 10, wherein the at least one light indicates the available storage capacity by conveying the available storage capacity.

15. The input device of claim 10, comprising:
    a cut selector coupled to the housing and selectable to indicate a cut operation;
    a copy selector coupled to the housing and selectable to indicate a copy operation; and
    a paste selector coupled to the housing and selectable to indicate a paste operation;
    wherein the cut selector, copy selector, and paste selector are different from each other and are located at different portions of the housing; and
    wherein the cut, copy, and paste selectors are each illuminable with different color lamps.

16. A method, comprising:
receiving, at an input device, data from a second device different from the input device, the data being received as a result of at least one command comprising a cut command, a copy command, and/or a paste command;
storing the data at the input device; and
indicating, via at least one light bar on the input device, an available storage capacity of the input device subsequent to storing the data, wherein the available storage capacity is indicated by illuminating a first amount of the at least one light bar that is less than a total illuminable amount of the at least one light bar.

17. The method of claim 16, wherein the data is received as a result of at least one command comprising a cut command and/or a copy command.

18. The method of claim 16, wherein the at least one light bar comprises at least one light emitting diode (LED).

19. The method of claim 16, wherein the at least one light bar is illuminated to indicate the available storage capacity by conveying occupied storage capacity.

20. The method of claim 16, wherein the at least one light is illuminated to indicate the available storage capacity by conveying the available storage capacity.

\* \* \* \* \*